United States Patent
Sato et al.

(10) Patent No.: US 9,533,373 B2
(45) Date of Patent: Jan. 3, 2017

(54) POWDER OVERLAY NOZZLE

(71) Applicant: TOYOTA JIDOSHA KABUSHIKI KAISHA, Toyota-shi, Aichi (JP)

(72) Inventors: Akio Sato, Toyota (JP); Yoshinori Ishikawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 14/582,718

(22) Filed: Dec. 24, 2014

(65) Prior Publication Data
US 2015/0196975 A1 Jul. 16, 2015

(30) Foreign Application Priority Data
Jan. 14, 2014 (JP) .................................. 2014-003919

(51) Int. Cl.
*B23K 26/14* (2014.01)
(52) U.S. Cl.
CPC ......... *B23K 26/1476* (2013.01); *B23K 26/144* (2015.10); *B23K 26/1464* (2013.01); *B23K 26/342* (2015.10)
(58) Field of Classification Search
CPC ............ B23K 26/1462; B23K 26/1464; B23K 26/1476; B05B 1/24
See application file for complete search history.

(56) References Cited

U.S. PATENT DOCUMENTS

| 5,043,548 A * | 8/1991 | Whitney ................. B05B 7/228 219/121.47 |
| 5,477,026 A * | 12/1995 | Buongiorno ......... B23K 26/144 219/121.64 |
| 5,609,781 A * | 3/1997 | Kaga .................... B23K 26/032 219/121.67 |
| 6,534,745 B1 * | 3/2003 | Lowney ............. B23K 26/1482 219/121.63 |
| 7,626,136 B2 * | 12/2009 | Sato ..................... B23K 26/144 118/308 |
| 2005/0056628 A1 * | 3/2005 | Hu ....................... B23K 26/144 219/121.84 |
| 2006/0169679 A1 * | 8/2006 | Sato ..................... B23K 26/103 219/121.64 |
| 2006/0266740 A1 | 11/2006 | Sato et al. |

FOREIGN PATENT DOCUMENTS

| JP | 2005-021908 A | 1/2005 |
| JP | 2005-219060 A | 8/2005 |

* cited by examiner

*Primary Examiner* — Ryan Reis
(74) *Attorney, Agent, or Firm* — Oliff PLC

(57) ABSTRACT

Provided is a powder overlay nozzle that can increase the quality of an overlay layer formed on processing portion of a workpiece, and that can greatly increase workpiece productivity and maintainability. The powder overlay nozzle includes an inner nozzle member including a laser passage for passing laser beam, and an outer nozzle member externally fitted on the inner nozzle member. Between the inner nozzle member and the outer nozzle member, a discharge space for passing powder is formed. The outer nozzle member includes a supply channel for supplying the powder to the discharge space in a direction inclined with respect to an axis L of the powder overlay nozzle.

7 Claims, 12 Drawing Sheets

<First example>

POWDER OVERLAY NOZZLE

BACKGROUND

Technical Field

The present invention relates to powder overlay nozzles, and particularly to a powder overlay nozzle used for laser cladding processing for forming an overlay layer (cladding layer) on a workpiece.

Background Art

Conventionally, laser processing is known Whereby; in order to increase the durability of a valve seat of an engine cylinder head while increasing its design freedom, the valve seat is irradiated with laser beam while a powder (powdered) overlay material is supplied to the valve seat, forming an overlay layer (cladding layer) while the valve seat and the laser beam are relatively rotated. Specifically, the cylinder head that has been subjected to a machining process required for the engine combustion chamber, such as a valve opening forming process, is irradiated with laser beam while an area of the cylinder head that is to be formed into the valve seat is supplied with the powdered overlay material. The powdered overlay material may include a copper alloy and the like having abrasion resistance. In this way, a ring-shaped overlay layer, namely an overlay bead portion, that is to eventually provide the valve seat, is formed. Generally, the technology is referred to as laser cladding processing.

In the above laser cladding processing, generally a coaxial nozzle (powder overlay nozzle) of double-pipe structure is adopted which is configured to pass laser beam while discharging the powder metal from around the laser beam. As an example of such conventional powder overlay nozzle, a powder metal overlay nozzle illustrated in FIG. 13 is known (Patent Literature 1).

The conventional powder metal overlay nozzle illustrated in FIG. 13 includes a columnar body portion A and a nozzle portion B coaxially joined to the body portion A. The body portion A includes an outer member C and an inner member D fitted in a central space of the outer member C. Between the outer member C and the inner member D, there are formed a ring-shaped gas charged space F charged with inert gas, and a powder metal charged space F charged with powder metal as well as carrier gas. Into the powder metal charged space F, a plurality of supply channels G are opened. The powder metal charged space F is divided by dividing, portions I into charged regions corresponding to the respective supply channels G. At the bottom of the powder metal charged space F, there are formed a number of guide holes J for guiding the powder metal to the nozzle portion B, the guide holes J being disposed along the circumference of the bottom in parallel with an axis L and opening on the lower surface of the outer member C.

The powder metal overlay nozzle is linked with a laser beam generation device for a laser processing head, with the powder metal supply channels G of the body portion A being connected to a powder metal supply source (Which may also be referred to as a "feeder") via a supply pipe. The powder metal overlay nozzle is configured such that laser beam R emitted from the laser beam generation device connected over the body portion A passes through a laser passage K inside the body portion A and the nozzle portion B and irradiates a processing portion W of a workpiece via an irradiation opening M. On the other hand, the powder metal P supplied from the feeder to the powder metal supply channels G via the supply pipe together with the carrier gas is charged equally into the respective charged regions partitioned by the dividing portions I of the powder metal charged space F. The charged powder metal P passes through the guide holes J and discharge passages N and is discharged out of a discharge opening Q to an area around the processing portion W. The discharged powder metal P is melted by the laser beam R, whereby an overlay layer is formed on the processing portion W.

RELATED ART DOCUMENT

Patent Literature

Patent Literature 1: JP 2005-219060 A

SUMMARY

In the conventional powder metal overlay nozzle, the powder metal charged space formed in the body portion is divided into the charged regions corresponding to the respective supply channels for supplying the powder metal, with the powder metal discharge passages opening to the discharge opening at the nozzle portion tip. Thus, the powder metal charged in the respective charged regions can be guided within the range of each charged region to the discharge opening and uniformly discharged from the peripheral edge of the discharge opening.

In the conventional powder metal overlay nozzle, the powder metal supplied from the feeder is charged into the charged regions in the powder metal charged space via the supply channels formed in a direction generally orthogonal to the nozzle axis, and the powder metal once charged in the charged regions is passed through the guide holes and the discharge passages and then discharged from around the laser beam via the discharge opening. In this case, the speed of the powder metal in the powder metal overlay nozzle may be decreased. Generally, in laser cladding processing, the powder metal overlay nozzle is used in an inclined posture with respect to the vertical direction. Thus, in the conventional powder metal overlay nozzle, as the inclination angle of the axis with respect to the vertical direction increases, the powder metal may be located unevenly vertically below hr the powder metal overlay nozzle due to gravity. As a result, the powder metal discharged from the discharge opening may become uneven around the laser beam, lowering the quality of the overlay layer formed on the processing portion of the workpiece.

The present invention was made in view of the above problem, and an object of the present invention is to provide a powder overlay nozzle that can increase the quality of the overlay layer formed on the processing portion of the workpiece, and that can greatly increase workpiece productivity and maintainability.

In order to achieve the object, a powder overlay nozzle according to the present invention includes an inner nozzle member including a laser passage for passing laser beam; and an outer nozzle member externally fitted on the inner nozzle member, the inner nozzle member and the outer nozzle member forming a discharge space between the members for passing powder. The outer nozzle member includes a supply channel for supplying the powder to the discharge space in a direction inclined with respect to an axis of the powder overlay nozzle.

In the powder overlay nozzle according to the above aspect; the supply channel for supplying the powder to the discharge space formed between the inner nozzle member and the outer nozzle member is provided in the outer nozzle member in a direction inclined with respect to the axis of the powder overlay nozzle. Thus, the decrease in speed of the powder in the powder overlay nozzle, particularly in the discharge space, can be suppressed. Accordingly, the powder distribution in the powder overlay nozzle can be made uniform even when the powder overlay nozzle is used in a posture inclined with respect to the vertical direction. As a result, the powder can be discharged from around the laser beam generally uniformly, and the quality of the overlay layer famed at the processing portion of the workpiece can be increased. The "direction inclined with respect to the axis of the powder overlay nozzle" refers to a direction such that the angle formed by the central axis of the supply channel and the axis of the powder overlay nozzle is greater than 0° and smaller than 90°.

In a preferred aspect, the discharge space may include a plurality of flow passage walls defining the discharge space into a plurality of discharge passages about the axis.

In the powder overlay nozzle according to the above aspect, the discharge space formed between the inner nozzle member and the outer nozzle member is provided with a plurality of flow passage walls defining, the discharge space into a plurality of discharge passages about the axis. Thus, the powder distribution in the powder overlay nozzle, particularly in the discharge space, can be made more uniform.

Preferably, the flow passage walls may be formed in at least one of the inner nozzle member and the outer nozzle member.

In a preferred aspect of the powder overlay nozzle, of the plurality of flow passage walls a flow passage wall disposed along a central axis of the supply channel may include a guide portion for guiding the powder supplied from the supply channel in a direction inclined with respect to the central axis.

In the powder overlay nozzle according to the above aspect, the flow passage wall disposed along the central axis of the supply channel includes the guide portion guiding the powder supplied from the supply channel in the direction inclined with respect to the central axis of the supply channel. Thus, the powder distribution in the powder overlay nozzle, particularly in the discharge space, can be made more uniform.

When the guide portion is disposed on an end face of the flow passage wall on the supply channel side, and includes an inclined face inclined with respect to the central a is the powder distribution in the powder overlay nozzle, particularly in the discharge space, can be made more uniform by a simple configuration.

When the guide portion includes a protruding portion protruding toward the supply channel beyond the flow passage walls other than the flow passage wall disposed along the central axis of the supply channel, the powder supplied via the supply channel is guided in the direction inclined with respect to the central axis by colliding with the protruding portion protruding on the supply channel side of the flow passage all disposed along the central axis of the supply channel. Thus, the powder distribution in the powder overlay nozzle, particularly in the discharge space, can be more reliably made uniform.

In a preferred aspect of the powder overlay nozzle, the flow passage walls may include end faces on the supply channel side thereof which are disposed lower with increasing distance from the central axis of the supply channel.

In the powder overlay nozzle according to the above aspect, the end faces on the supply channel side of the flow passage wall are lowered with increasing distance from the central axis of the supply channel. Thus, even when the axial flow velocity of the powder supplied via the supply channel into the discharge space is decreased with increasing distance from the central axis of the supply channel, for example, the powder can be introduced generally uniformly into the respective discharge passages defined by the flow passage walls. Accordingly, the powder distribution in the powder overlay nozzle, particularly in the discharge space, can be more reliably made uniform.

Preferably, the outer nozzle member may include a body portion connected to the laser processing head and provided with the supply channel, and an outer nozzle portion connected to the body portion and forming, with the inner nozzle member, a discharge opening.

Preferably, a plurality of the supply channels may be provided at equal intervals about the axis of the powder overlay nozzle.

As will be understood from the foregoing description, in the powder overlay nozzle according to the present invention, the supply channel for supplying the powder to the discharge space formed between the inner nozzle member and the outer nozzle member is disposed in a direction inclined with respect to the axis of the powder overlay nozzle. By this simple configuration, the quality of the Overlay layer formed on the processing portion of the workpiece can be increased, and workpiece productivity and maintainability can be greatly increased.

BRIEF DESCRIPTION OF THE DRAWINGS

FIG. 9A illustrates the experimental result of the first example; FIG. 9B illustrates the experimental result of the second example; FIG. 9C illustrates the experimental result of the third example.

DETAILED DESCRIPTION OF THE EMBODIMENTS

In the following, embodiments of the powder overlay nozzle according to the present invention will be described with reference to the drawings.

{First Embodiment}

Figure 1:
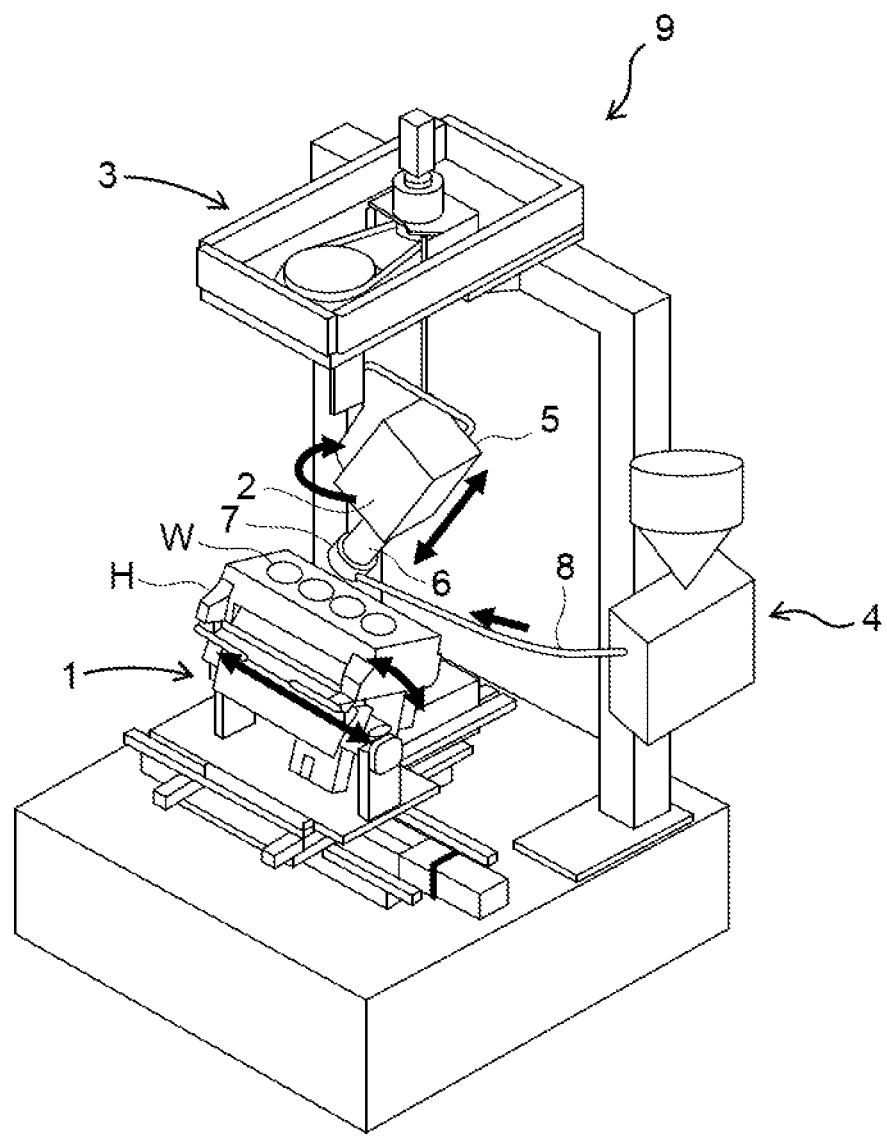
FIG. 1 is a perspective view schematically illustrating the main elements of a laser cladding processing device to which a first embodiment of a powder overlay nozzle according to the present invention is applied.

FIG. 1 is a perspective view schematically illustrating the main elements of a laser cladding processing device 9 to which a first embodiment of a powder overlay nozzle according to the present invention is applied.

The laser cladding processing device 9 is a device that performs laser cladding processing on a valve seat portion (processing portion) W of a cylinder head (workpiece) H, for example. The laser cladding processing device 9 includes a cylinder head holder device 1 that tilts and holds the cylinder head H; a laser processing head 2 that discharges powder metal (powder) (such as a material having copper as a principal component) while irradiating the processing portion with laser beam; a rotating device 3 that rotates the laser processing head 2 about a vertical axis while holding the head at an angle with respect to the vertical direction, and a powder supply device (feeder) 4 that supplies the powder metal to the laser processing head 2.

The cylinder head holder device 1 is configured to tilt the cylinder head H so as to align the central axis of the valve seat portion W with the vertical direction, or to two-dimensionally move the cylinder head H in the horizontal direction so as to alias the central axis of the valve seat portion W with the rotating axis of the laser processing head 2.

The laser processing head 2 includes a laser generation portion 5 that generates laser beam, and an optical system portion 6 housing, e.g., condensing lenses for condensing the laser beam. To the tip portion of the optical system portion 6, there is connected a powder overlay nozzle (which may also be referred to as a "coaxial nozzle") 7 of double pipe structure configured to pass the laser beam while discharging powder metal from around the laser beam. The powder overlay nozzle 7 is connected to the feeder 4 via a supply pipe 8. In the laser cladding processing device 9, an amount of powder metal corresponding to the overlay layer (cladding layer) to be formed on the processing portion is supplied from the feeder 4 to the powder overlay nozzle 7, and the laser generation portion 5 generates laser beam of an output corresponding to the powder metal. The powder metal is discharged via the powder overlay nozzle 7 while the processing portion W is irradiated with laser beam so that a desired overlay layer (cladding layer can be formed on the valve seat portion W of the cylinder head H.

Figure 2:
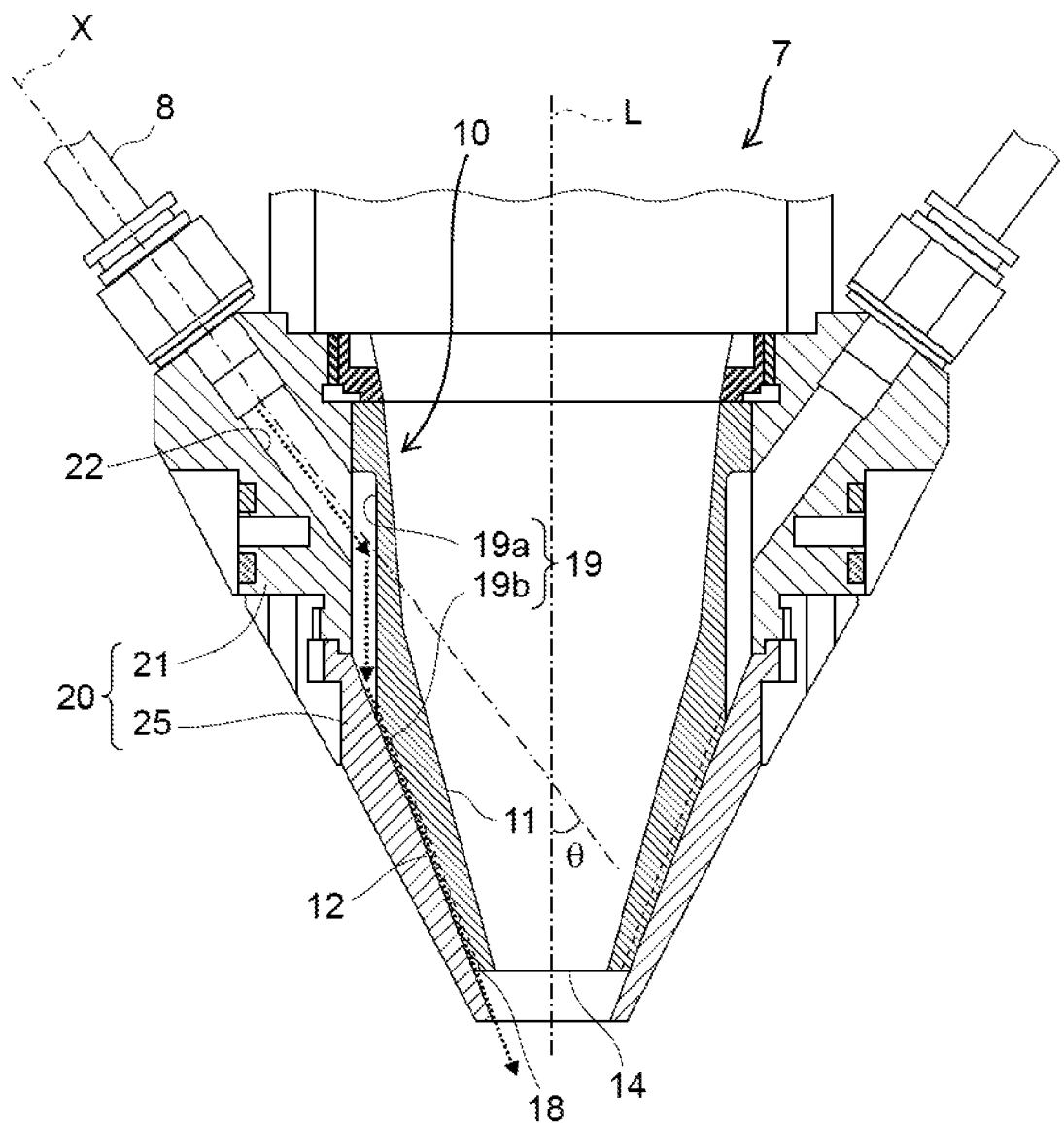
FIG. 2 is a longitudinal cross sectional view illustrating an overall configuration of the first embodiment of the powder overlay nozzle according to the present invention.

FIG. 2 is a longitudinal cross sectional view illustrating an overall configuration of the powder overlay nozzle of FIG. 1 (the overall configuration of the first embodiment of the powder overlay nozzle according to the present invention).

The powder overlay nozzle 7 is mainly provided with a generally circular pipe-shaped inner nozzle member 10 including a laser passage 11 for passing laser beam, and an outer nozzle member 20 externally fitted on the inner nozzle member 10. The inner nozzle member 10 and the outer nozzle member 20 are coaxially disposed, with a generally ring-shaped discharge space 19 defined between the inner nozzle member 10 and the outer nozzle member 20 for passing the powder. The inner nozzle member 10 includes an inner peripheral surface and an outer peripheral surface with decreasing diameters toward the tip along the axis L.

The outer nozzle member 20 includes a body portion 21 connected to the optical system portion 6 of the laser processing head 2, and an outer nozzle portion 25 connected to the body portion 21.

The body portion 21 includes supply channels 22 bored therein in a direction inclined with respect to the axis L of the powder overlay nozzle 7 and in communication with an upper-end side of the discharge space 19. A plurality of the supply channels 22 is disposed at equal intervals (such as four supply channels at 90° intervals) about the axis L of the powder overlay nozzle 7 (i.e., disposed in the circumferential direction). To the respective supply channels 22, there is connected the supply pipe 8, which is connected to the feeder 4 as described above. The supply channels 22 are bored such that their central axis X (the axis in the direction of supply of the powder from the supply channels 22) intersects the axis L of the powder overlay nozzle 7. The central axis X of each supply channel 22 and the axis L of the powder overlay nozzle 7 form an angle θ which is set in a range of greater than 0° and smaller than 90°. Preferably, the angle θ is set in consideration of the inclination of the laser processing head 2 during laser cladding processing. Namely, it is preferable that, in order to ensure the speed of the powder (powder metal) in the powder overlay nozzle 7 during laser cladding processing, the angle θ is set to be smaller than the angle of inclination of the axis of the laser processing head 2 (the axis L of the powder overlay nozzle 7) with respect to the vertical direction during laser cladding processing.

The outer nozzle portion 25 has an inner peripheral surface of a shape complementary to the tip side of the outer peripheral surface of the inner nozzle member 10. The outer nozzle portion 25 forms, together with inner nozzle member 10, a discharge opening 18 for discharging the powder out of the powder overlay nozzle 7.

While not illustrated in the drawings, the body portion 21 has a gas supply channel bored therein through which an inert gas, such as nitrogen gas, is passed. The inert gas supplied via the gas supply channel is supplied to the laser passage 11 of the inner nozzle member 10 via a gas charged space defined between the inner nozzle member 10 and the body portion 21 and via a plurality of gas discharge channels formed by boring the inner nozzle member 10 in communication with the gas charged space.

The discharge space 19 between the inner nozzle member 10 and the outer nozzle member 20 includes a ring-shaped upper discharge space 19a and a lower discharge space 19b. The ring-shaped upper discharge space 19a is defined mainly by the upper-end side of the outer peripheral surface of the inner nozzle member 10 and the inner peripheral surface of the body portion 21 and extended in the axis L direction. The lower discharge space 19b is defined mainly by the tip side of the outer peripheral surface of the inner nozzle member 10 and the inner peripheral surface of the outer nozzle portion 25 and extended in a direction inclined with respect to the axis L direction.

The ring-shaped upper discharge space 19a is divided, by a plurality of dividing walls (not illustrated) disposed at equal intervals about the axis L (circumferential direction) (such as four dividing walls at 90° intervals), into small spaces corresponding to the respective supply channels 22 bored in the body portion 21. The supply channels 22 are in communication with the respective small spaces at generally the center (in the circumferential direction) of each small space about the axis L and on the upper-end side of each small space, so that the powder can be introduced into the respective small spaces therefrom.

The lower discharge space 19b in communication with the upper discharge space 19a and having the decreasing diameter toward the tip side are defined into a plurality of discharge passages 19c about the axis L by a plurality (such as a number greater than the number of the supply channels 22 or the dividing walls) of flow passage walls 12 (see FIG. 3) integrally formed with the outer peripheral surface of the inner nozzle member 10. The powder introduced into the lower discharge space 19b via the upper discharge space 19a passes through the respective discharge passages 19c between the flow passage walls 12 and is supplied to the discharge opening 18 at the lower end of the inner nozzle member 10 along the axis L direction. The flow passage walls 12 are formed at equal intervals (in the circumferential direction) about the axis L and bilaterally symmetrically with respect to the central axis X of each supply channel 22.

Figure 3:
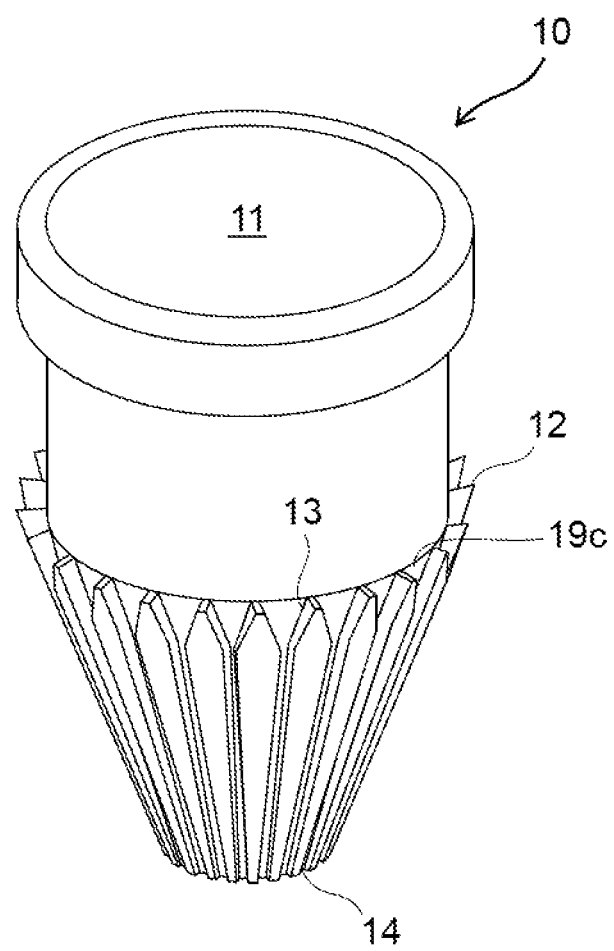
FIG. 3 is a perspective view of an inner nozzle member of the powder overlay nozzle illustrated in FIG. 2.
Figure 4:
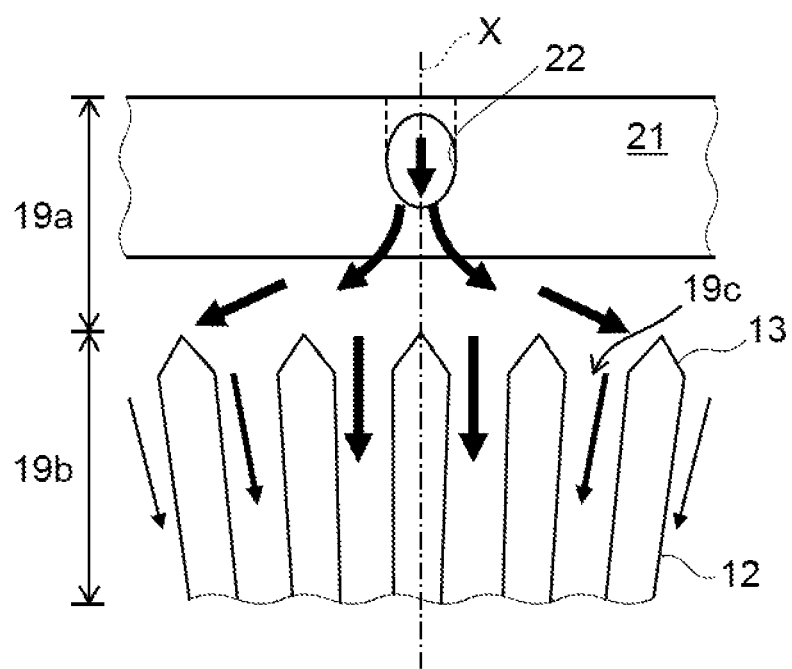
FIG. 4 is a schematic diagram schematically illustrating the flow of powder in the powder overlay nozzle of FIG. 2.

On the upper-end face (end face on the supply channel side) 13 of each of the flow passage walls 12, there are formed inclined faces (guide portion) inclined with respect to the central axis X of the supply channel 22, as illustrated in FIG. 3 and FIG. 4. The powder introduced into the lower discharge space 19b is guided by the inclined faces in a direction inclined with respect to the central axis X direction; namely, the powder is guided in the circumferential direction.

The flow passage walls 12 defining the lower discharge space 19b into the plurality of discharge passages 19c may be formed in the inner peripheral surface of the outer nozzle portion 25 of the outer nozzle member 20. Alternatively, the flow passage walls 12 may be formed in both the outer peripheral surface of the inner nozzle member 10 and the inner peripheral surface of the outer nozzle member 20.

In this configuration, the powder (powder metal) supplied from the feeder 4 via the supply pipe 8 is guided, together with the carrier gas (such as nitrogen gas) and via the supply channels 22 bored in the body portion 21, to the upper-end side of the upper discharge space 19a in a direction inclined with respect to the axis L. The powder is further guided in the axis L direction through the small spaces in the upper discharge space 19a. The powder guided to the lower discharge space 19b is supplied to the respective discharge passages 19c in the lower discharge space 19b while being guided, by the inclined faces (guide portion) formed on the upper-end faces of the flow passage walls 12 in the lower discharge space 19b, in the direction inclined with respect to the central axis X of the supply channel 22. Namely, the powder is guided in the circumferential direction or lateral direction. The powder is then guided generally along the axis L while approaching the axis L in the respective discharge passages 19c (see FIG. 4). The powder that has passed through the discharge passages 19c of the lower discharge space 19b is discharged toward a predetermined point on the axis L from around the laser beam via the ring-shaped discharge opening 18 formed by the lower end of the inner nozzle member 10 and the outer nozzle portion 25.

The powder discharged via the discharge opening 18 is melted by the laser beam that has been emitted from the laser generation portion 5 of the laser processing head 2, connected over the body portion 21, and that has passed the laser passage 11 of the inner nozzle member 10 and the irradiation opening 14 formed by the tip of the inner peripheral surface of the laser passage 11. The molten powder is welded on the processing portion of the workpiece, and, as the welded powder cools and solidifies, an overlay layer (cladding layer) having a predetermined thickness and outer diameter is formed on the processing portion of the workpiece. The laser passage 11 doubles as a passage for the inert gas supplied via the gas supply channel or the gas discharge channels and the like, as described above. Thus, during the laser cladding processing, the inert gas is sprayed via the irradiation opening 14 onto the processing portion of the workpiece.

Thus, in the powder overlay nozzle 7 according to the first embodiment, the supply channels 22 for supplying powder to the discharge space 19 formed between the inner nozzle member 10 and the outer nozzle member 20 are provided in a direction inclined with respect to the axis L. The discharge space 19 is provided with a plurality of flow passage walls defining the discharge space 19 into a plurality of discharge passages disposed about the axis L (i.e., disposed in the circumferential direction), whereby the powder can be supplied to each of the discharge passages 19c in the discharge space 19 while suppressing the decrease in speed of the powder in the powder overlay nozzle 7. Accordingly, even when the powder overlay nozzle 7 is used in a posture inclined with respect to the vertical direction, the distribution of the powder in the powder overlay nozzle 7, particularly in the discharge space 19, can be made uniform. As a result, the powder can be discharged from around the laser beam generally uniformly, whereby the quality of the overlay layer formed on the processing portion of the workpiece can be increased.

Further, because overlay deficiency in the overlay layer formed on the processing portion of the workpiece can be decreased, the need for powder supply in consideration of the overlay deficiency can be eliminated, whereby the manufacturing cost can be advantageously decreased. Because the clogging or residue and the like of the powder in the powder overlay nozzle 7 can be decreased, product productivity and nozzle maintainability can be advantageously greatly increased.

{Second Embodiment}

Figure 5:
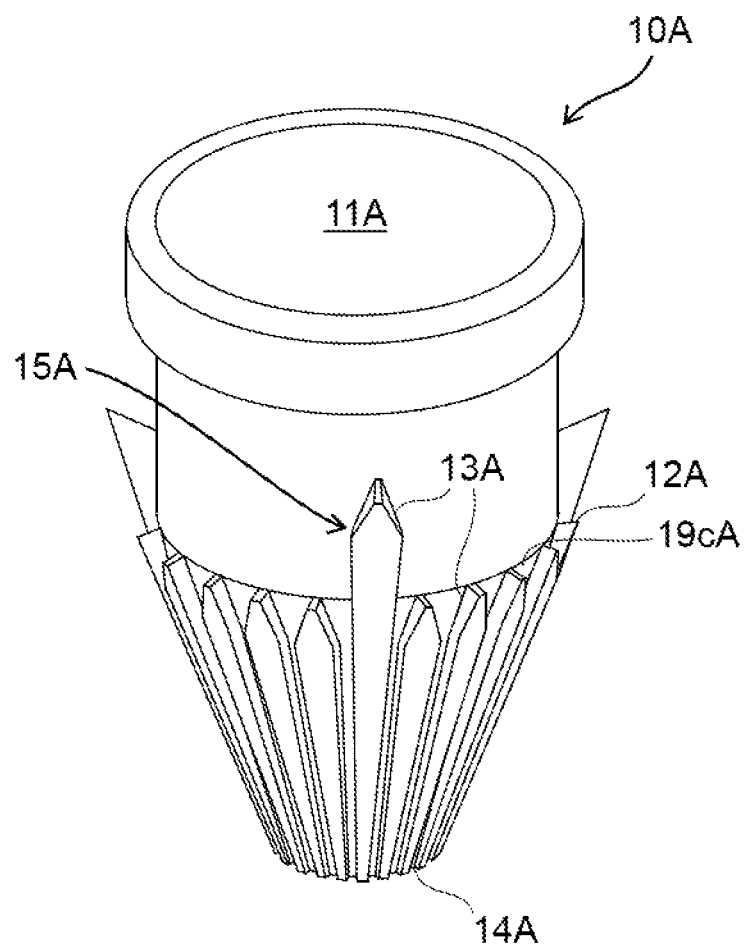
FIG. 5 is a perspective view of the inner nozzle member used in a second embodiment of the powder overlay nozzle according to the present invention.

FIG. 5 is a perspective view of the inner nozzle member used in a second embodiment of the powder overlay nozzle according to the present invention. The powder overlay nozzle according to the second embodiment is similar to the powder overlay nozzle according to the first embodiment with the exception of the configuration of the inner nozzle member thereof. Thus, in the following, mainly the configuration of the inner nozzle member will be described, where the elements similar to those of the powder overlay nozzle of the first embodiment will be designated with similar reference signs with their detailed description omitted.

Figure 6:
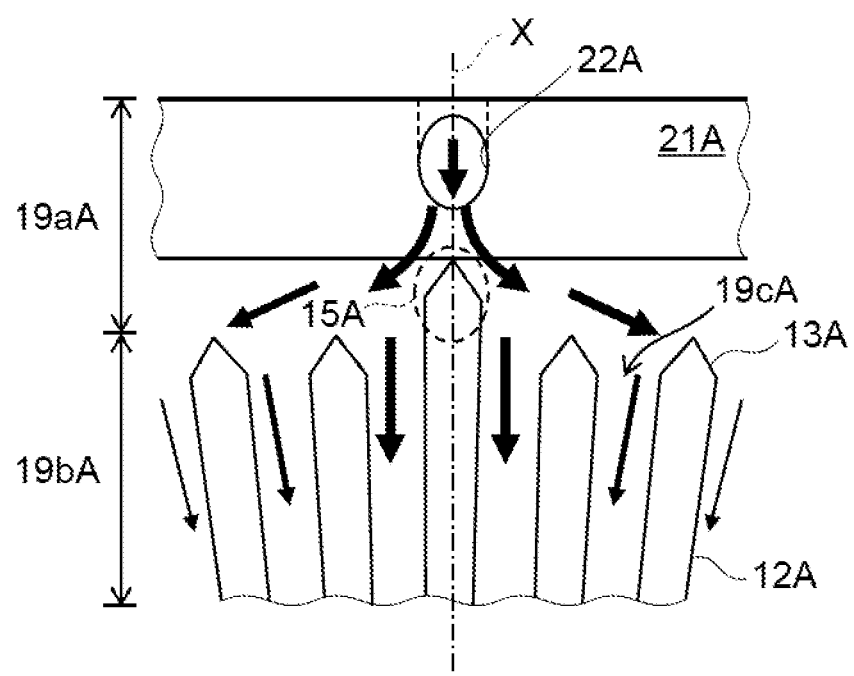
FIG. 6 is a schematic diagram schematically illustrating the flow of powder in the powder overlay nozzle of the second embodiment.

As illustrated in FIG. 5 and FIG. 6, in an inner nozzle member WA used in the powder overlay nozzle according to the second embodiment, of a flow passage walls 12A provided in a lower discharge space 19bA, the flow passage walls 12A provided along the central axis X of supply channels 22A bored in a body portion 21A include a protruding portion 15A extending and protruding beyond the other flow passage walls 12A on the supply channel 22A side (upward). Upper-end faces 13A of the respective flow passage walls 12A are provided with inclined faces inclined with respect to the central axis X of the supply channels 22A, as described above. The amount of protrusion of the protruding portions 15A of the flow passage walls 12A provided along the central axis X of the supply channels 22A may be designed as needed depending on the flow rate or flow velocity and the like of the powder so that, for example, the upper end of the protruding portions 15A is located below the supply channels 22A in the upper discharge space 19aA.

Thus, the powder supplied to the upper discharge space 19aA via the supply channels 22A bored in the body portion 21A collides with the upper-end faces 13A of the flow passage walls 12A disposed along the central axis X of the supply channels 22A, as illustrated in FIG. 6. As a result, the powder is supplied to respective discharge passages. 19cA in the lower discharge space 19bA while being guided by the inclined faces (guide portion) of the upper-end faces 13A in a direction inclined with respect to the central axis X of the supply channels 22A. Namely, the powder is guided in the circumferential direction or the lateral direction.

Thus, in the powder overlay nozzle according to the second embodiment, the powder supplied to the upper discharge space 19aA via the respective supply channels 22A is guided, by the protruding portions 15A of the flow passage walls 12A provided along the central axis X of the supply channels 22A, and by the inclined faces of the upper-end faces 13A of the flow passage walls 12A, in the direction inclined with respect to the central axis. X of the supply channels 22A. Namely, the powder is guided in the circumferential direction. Accordingly, the distribution of the powder in the powder overlay nozzle, particularly in the discharge space, can be made more uniform. As a result, the powder can be discharged more uniformly from around the laser beam whereby the quality of the overlay layer formed on the processing portion of the workpiece can be farther increased.

{Third Embodiment}

Figure 7:
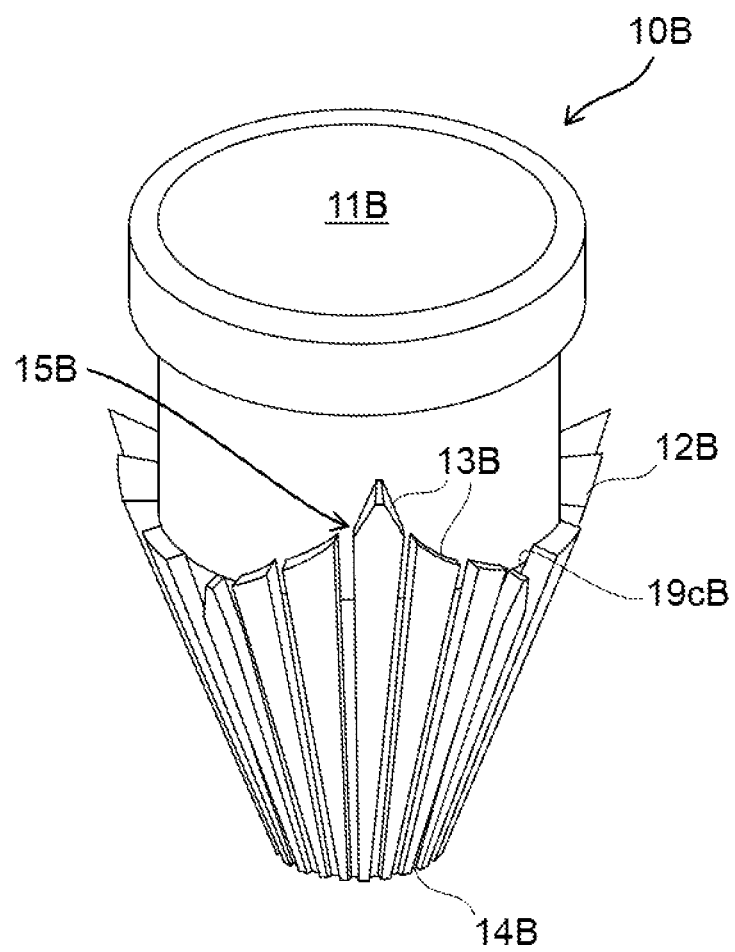
FIG. 7 is a perspective view of the inner nozzle member used in a third embodiment of the powder overlay nozzle according to the present invention.

FIG. 7 is a perspective view of the inner nozzle member used in a third embodiment of the powder overlay nozzle according to the present invention. The powder overlay nozzle according to the third embodiment is similar to the powder overlay nozzle according to the first and the second embodiments with the exception of the configuration of the inner nozzle member. Thus, in the following, particularly the configuration of the inner nozzle member will be described, where the elements similar to those of the powder overlay nozzle according to the first and the second embodiments will be designated with similar signs, with their detailed description omitted.

Figure 8:
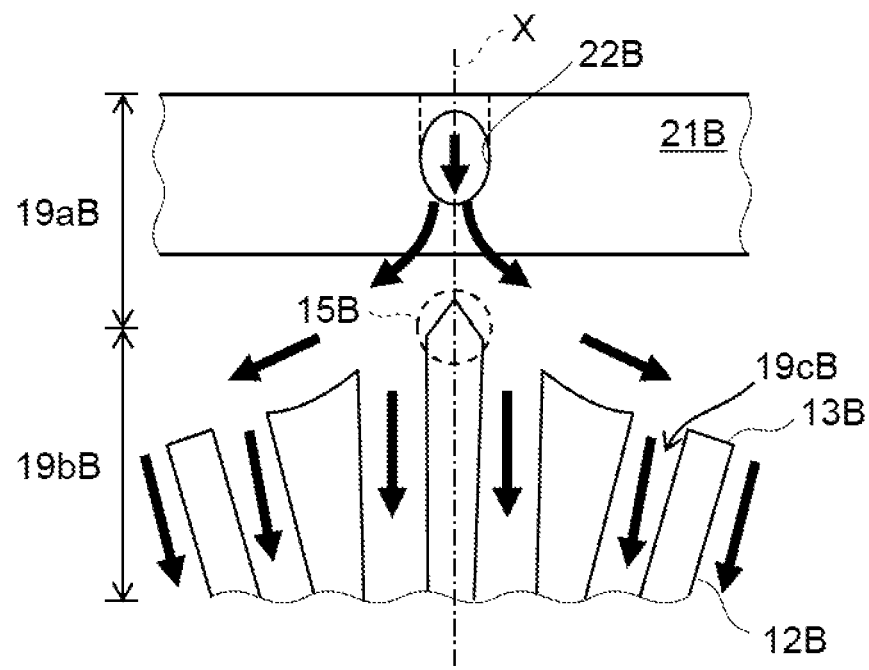
FIG. 8 is a schematic diagram schematically illustrating the flow of powder in the powder overlay nozzle of the third embodiment.
Figure 9A:
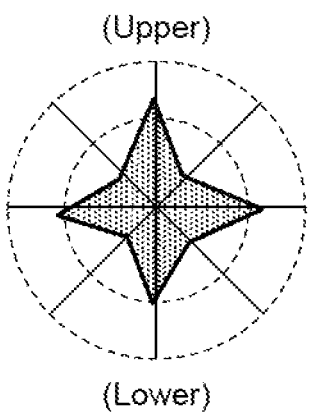
FIGS. 9A to 9C illustrate experimental results of measurement of a powder distribution near the discharge opening according to first to third examples and a comparative example using specimens.
Figure 9B:
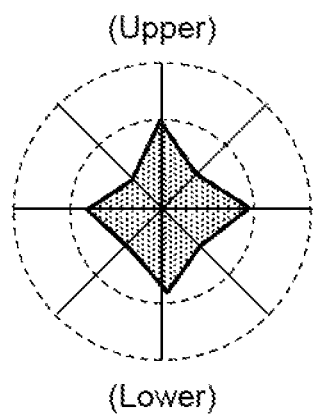
Figure 9C:
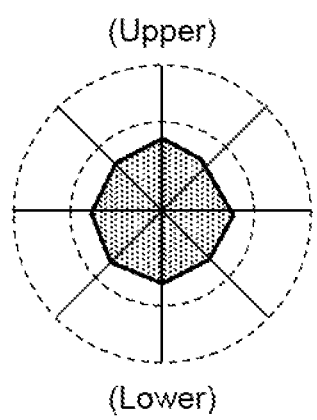
Figure 9D:
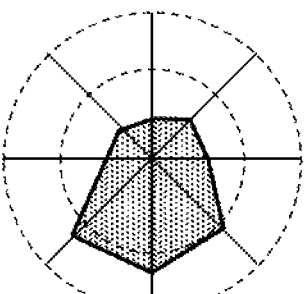
FIG. 9D illustrates; the experimental result of the comparative example.

As illustrated in FIG. 7 and FIG. 8, in an inner nozzle member 10B used in the powder overlay nozzle according to the third embodiment, flow passage walls 12B disposed along the central axis X of supply channels 22B bored in a body portion 21B include a protruding portion 15B protruding and extending beyond the other flow passage walls 12B on the supply channel 22B side (upward). The upper-end faces (the end faces on the supply channel 22B side) of the other flow passage walls (i.e., the flow passage walls to the sides in the circumferential direction of the flow passage walls 12B disposed along the central axis X of the supply channel 22B) are disposed lower with increasing distance from the central axis X of the supply channels 22B. The shape of the upper-end faces of the other flow passage walls may be designed as needed depending on the flow rate or flow velocity and the like of the powder, for example.

Thus, the powder supplied to the upper discharge space 19aB via the supply channels 22B bored in the body portion 21B collides with the upper-end faces 13B of the flow passage walls 12B disposed along the central axis X of the supply channels 22B, as illustrated in FIG. 8. The powder is further supplied to discharge passages 19cB in a lower discharge space 19bB while being guided by the inclined fares (guide portion) of the upper-end faces 13B in a direction inclined with respect to the central axis X of the supply channels 22A. Namely, the powder is guided in the circumferential direction or lateral direction. Because the upper-end faces 13B of the flow passage walls 12B are disposed lower with increasing distance from the central axis X of the supply channels 22B, the powder can be guided further to the sides in the circumferential direction. As a result, the powder can be reliably supplied to the discharge passages 19cB of the lower discharge space 19bB which are spaced from the central axis X of the supply channels 22B.

Thus, in the powder overlay nozzle according to the third embodiment, the powder supplied to the upper discharge space 19aB via the supply channels 22B is guided, by the protruding portions 15B of the flow passage walls 12B disposed along the central axis X of the supply channels 22B and the inclined faces of the upper-end faces 13B of the flow passage walls 12B, in the direction inclined with respect to the central axis X of the supply channels 22B, namely in the circumferential direction. Further, the upper-end faces 13B of the flow passage walls 12B disposed to the sides are lowered with increasing distance from the central axis X of the supply channels 22B. Accordingly, the powder can be guided further to the sides in the circumferential direction, so that, even when a plurality of the supply channels 22B is disposed around the axis (i.e., disposed in the circumferential direction), for example, the distribution of the powder in the powder overlay nozzle, particularly in the discharge space, can be made more uniform. As a result, the powder can be discharged from around the laser beam more uniformly, whereby the quality of the overlay layer formed on the processing portion of the workpiece can be increased even more.

While the first to the third embodiments have been described mainly with reference to the aspect in which the powder metal used for laser cladding processing is supplied, any powder may be applied as long, as a desired overlay layer can be forted on the processing portion of the workpiece.

In the first to the third embodiments, the upper discharge space is divided into a plurality of small spaces disposed around the axis (i.e., disposed in the circumferential direction) by the dividing walls. However, the dividing walls may be omitted, or the number of the dividing walls may be decreased (namely, the number may be different from the number of the supply channel by design) if the uniformity of powder distribution in the powder overlay nozzle can be ensured.

{Experiment Measuring Powder Distribution Near Discharge Opening, Machining Allowance of Overlay Layer, and Powder Discharge Characteristics of the Specimens, and Results Thereof}

Using four specimens (the first to the third examples, comparative example) fabricated with different shapes of the flow passage walls of the inner nozzle member and of the supply channels of the outer nozzle member, the present inventors conducted powder distribution measurement near the discharge opening, machining allowance measurement of the overlay layer formed by laser cladding processing, and powder discharge characteristics measurement, during operation of the laser cladding processing device with the specimens connected to the laser processing head of the laser cladding processing device (see FIG. 1). Uniformity of the powder as it was discharged from the discharge opening was evaluated around the laser beam (around the axis of the powder overlay nozzle).

Figure 13:
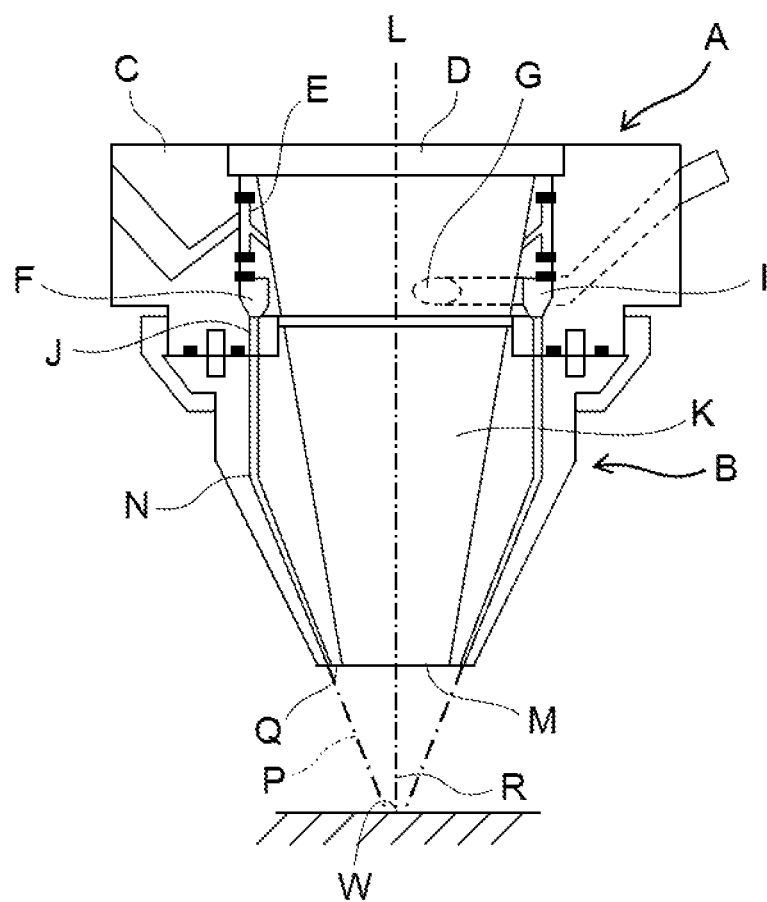
FIG. 13 is a longitudinal cross sectional view of a conventional powder overlay nozzle.

In the specimens of the first to the third examples and the comparative example, the powder overlay nozzles according to the first to the third embodiments and a nozzle similar to the conventional powder overlay nozzle illustrated in FIG. 13, respectively, were used. In the specimens of the first to the third examples, the angle formed by the central axis of the supply channels of the outer nozzle member and the axis of the powder overlay nozzle (see FIG. 2) was approximately 37°. In the specimen of the comparative example, the angle formed by the central axis of the supply channels of the outer nozzle member and the axis of the powder overlay nozzle was approximately 90°. The inclination angle of the axis of the laser processing head (the axis of the powder overlay nozzle) with respect to the vertical direction during the operation of the laser cladding processing device was approximately 45°. In the body portion of the outer nozzle member, four supply channels were formed at 90° intervals about the axis of the powder overlay nozzle. The laser processing head was inclined with respect to the vertical direction so that, of the four supply channels formed in the body portion, two opposite supply channels were disposed one next to the other in the vertical direction.

<Method of Measuring Powder Distribution Near the Discharge Opening of the Specimens>

A method of measuring the powder distribution near the discharge opening of the specimens will be briefly described. The laser processing head of the laser cladding processing device to which each specimen was attached was inclined with respect to the vertical direction, with a receiver member for receiving the powder (material including copper as a principal component) as it was discharged from the discharge opening mounted near the discharge opening of the respective specimen. In this posture, the laser cladding processing device was operated, spraying the powder onto the receiver member together with the carrier gas (nitrogen). Then, the distribution of the powder that became attached to the surface of the receiver member was visually confirmed.

<Results of Measurement of the Powder Distribution Near the Discharge Opening of the Specimens>

FIG. 9 illustrates the experimental results of measurement of the powder distribution near the discharge opening of the specimens according to die fast to the third examples and the comparative example. FIG. 9A illustrates the experimental result of the first example; FIG. 9B illustrates the experimental result of the second example; FIG. 9C illustrates the experimental result of the third example; and FIG. 9D illustrates the experimental result of the comparative example. In FIG. 9, "upper" indicates the upper side in the vertical direction of the powder overlay nozzle when the laser processing head was inclined with respect to the vertical direction, and "lower" indicates the lower side in the vertical direction thereof.

As illustrated in FIG. 9, in the specimen according to the comparative example, it was confirmed that the powder was unevenly distributed toward the lower side in the vertical direction. On the other hand, in the specimens according, to the first to the third examples, it was confirmed that the powder was distributed generally uniformly about the axis of the powder overlay nozzle. Particularly, in the specimen according to the third example, it was confirmed that the powder was supplied between the adjacent supply channels, and that the powder was more uniformly distributed about the axis of the powder overlay nozzle, <Method of Measuring Machining Allowance of the Overlay Layer of the Specimens>

A method of measuring the machining allowance of the overlay layer of the specimens will be briefly described. The laser cladding processing device to which the specimen of each of the first example and the comparative example was attached was operated, and the powder (material including copper as a principal component) was sprayed together with the carrier gas (nitrogen), forming an overlay layer on the valve seat portion of a cylinder head. The machining allowance (the amount of removal) of the overlay layer was measured at eight locations around the opening of the valve seat portion, and an average value of the machining allowance and its variation were calculated.

<Results of Measurement of the Machining Allowance of the Overlay Layer of the Specimens>

Figure 10:
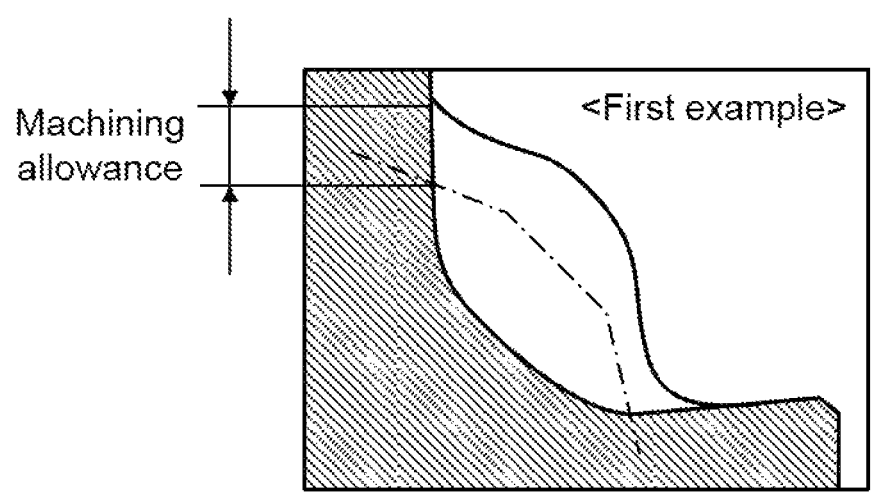
FIG. 10 illustrates the result of photography of a cross section of an overlay layer formed in the first example using the specimens.
Figure 11:
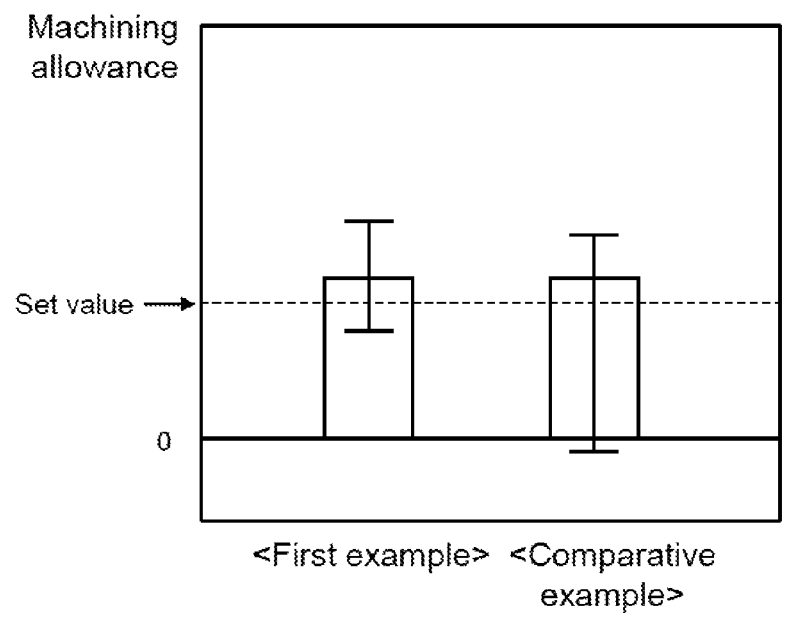
FIG. 11 illustrates an experimental result of measurement of a machining allowance of the overlay layer formed in the first example and the comparative example using the specimens.

FIG. 10 illustrates the result of photography of a cross section of the overlay layer formed in the specimen according to the first example. FIG. 11 illustrates the experimental result of measurement of the machining allowance of the overlay layer formed in the specimens according to the first example and the comparative example.

As illustrated in FIG. 11, in the specimen according to the first example, variation in machining allowance (namely, the thickness of the overlay layer) was small compared with the specimen of the comparative example. Thus, it was confirmed that the machining allowance can be ensured around the opening of the valve seat portion (processing portion).

<Method of Measuring the Powder Discharge Characteristics of the Specimens>

A method of measuring the powder discharge characteristics of the specimens will be briefly described. The laser cladding processing device to which the specimen of each of the first example and the comparative example was attached was operated, and the powder (material including copper as a principal component) was sprayed together with the carrier gas (nitrogen). The flow rate of the powder discharged from the discharge opening was measured chronologically, using an electronic scale.

<Results of Measurement of the Powder Discharge Characteristics of the Specimens>

Figure 12:
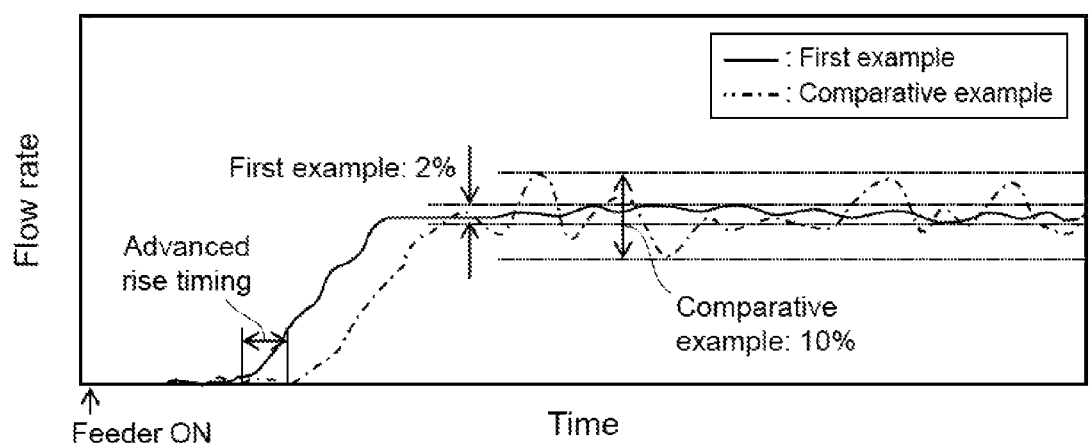
FIG. 12 illustrates the experimental results of measurement of powder discharge characteristics in the first example and the comparative example using the specimens.

FIG. 12 illustrates the experimental results of measurement of the powder discharge characteristics of the specimens according to the first example and the comparative example.

As illustrated, in the specimen according to the comparative example, variation in the flow rate of the powder discharged from the discharge opening was approximately 10%. On the other hand, in the specimen of the first example, variation in the flow rate of the powder discharged from the discharge opening was approximately 2%. Thus, it was confirmed that, in the specimen of the first example, the variation in the flow rate of the powder is decreased compared with the specimen of the comparative example. Possible reasons for this include a decrease in pulsation of the powder around the axis of the powder overlay nozzle due to the powder distribution being made uniform around the axis (i.e., in the circumferential direction) of the powder overlay nozzle, and a decrease in the clogging of residue and the like of the powder in the powder overlay nozzle.

It was also confirmed that, as illustrated in FIG. 12, in the specimen according to the first example, the discharge timing of powder is advanced compared with the specimen of the comparative example. This is due to the fact that the powder was supplied directly into the discharge space from the supply channels disposed in a direction inclined with respect to the axis of the powder overlay nozzle, rather than via a supply channel or a charged space disposed in a direction orthogonal to the axis of the powder overlay nozzle, and that the distance between the supply channels and the discharge opening is relatively decreased due to the formation of the supply channels in a direction inclined with respect to the axis of the powder overlay nozzle.

The experimental results proved that, by the simple configuration in which the supply channels for supplying the powder into the discharge space, formed between the inner nozzle member and the outer nozzle member, is inclined with respect to the axis of the powder overlay nozzle, the powder can be generally uniformly discharged from around the laser beam even when the powder overlay nozzle is used in an inclined posture with respect to the vertical direction, decreasing the overlay deficiency in the overlay layer formed on the processing portion of the workpiece. It was also confirmed that, because a generally uniform machining allowance can be ensured throughout the entire overlay layer formed on the processing portion of the workpiece the need for setting the powder supply in consideration of the machining allowance variation can be eliminated, thus decreasing manufacturing cost. It was further confirmed that, because the clogging or residue and the like of the powder in the powder overlay nozzle is decreased and the discharge timing of the powder is advanced, product productivity and nozzle maintainability can be greatly increased.

While the embodiments of the present invention have been described with reference to the drawings, the specific configuration of the present invention is not limited to the embodiments, and various design modifications and the like may be made within the scope of the gist of the present invention, and such modifications and the like are included in the present invention.

DESCRIPTION OF SYMBOLS

1 Cylinder head holder device
2 Laser processing head
3 Rotating device
4 Powder supply device (feeder)
5 Laser generation portion
6 Optical system portion
7 Powder overlay nozzle
8 Supply pipe
9 Laser cladding processing device
10 Inner nozzle member
11 Laser passage
12 Flow passage wall
13 Upper-end face (end face on the supply channel side) of flow passage wall
14 Irradiation opening
15A Protruding portion
18 Discharge opening
19 Discharge space
19a Upper discharge space
19b Lower discharge space
19c Discharge passage
20 Outer nozzle member
21 Body portion
22 Supply channel
25 Outer nozzle portion
L Axis
X Central axis of supply channel

What is claimed is:

1. A powder overlay nozzle comprising:
an inner nozzle member including a laser passage for passing laser beam; and
an outer nozzle member externally fitted on the inner nozzle member,
the inner nozzle member and the outer nozzle member forming a discharge space between the members for passing powder,
wherein the outer nozzle member includes a supply channel for supplying the powder to the discharge space in a direction inclined with respect to an axis of the powder overlay nozzle at a portion of the supply channel that is in direct contact with the discharge space, such that a portion of the supply channel that communicates with the discharge space is inclined with respect to the axis of the powder overlay nozzle,
wherein the discharge space includes a plurality of flow passage walls defining the discharge space into a plurality of discharge passages about the axis,
wherein, of the plurality of flow passage walls, a flow passage wall disposed along a central axis of the supply channel includes a guide portion for guiding the powder supplied from the supply channel in a direction inclined with respect to the central axis,
wherein the guide portion includes a protruding portion protruding toward the supply channel beyond the flow passage walls other than the flow passage wall disposed along the central axis of the supply channel.

2. The powder overlay nozzle according to claim 1, wherein the flow passage walls are formed in at least one of the inner nozzle member and the outer nozzle member.

3. The powder overlay nozzle according to claim 1, wherein the guide portion is disposed on an end face of the flow passage wall on the supply channel side, and includes an inclined face inclined with respect to the central axis.

4. The powder overlay nozzle according to claim 1, wherein the flow passage walls include end faces on the supply channel side thereof which are disposed lower with increasing distance from the central axis of the supply channel.

5. The powder overlay nozzle according to claim 1, wherein the outer nozzle member includes a body portion connected to a laser processing head and provided with the supply channel, and an outer nozzle portion connected to the body portion and forming, with the inner nozzle member, a discharge opening.

6. The powder overlay nozzle according to claim 1, wherein a plurality of the supply channels is provided at equal intervals about the axis of the powder overlay nozzle.

7. The powder overlay nozzle according to claim 2, wherein, of the plurality of flow passage walls, a flow passage wall disposed along a central axis of the supply channel includes a guide portion for guiding the powder supplied from the supply channel in a direction inclined with respect to the central axis.

* * * * *